United States Patent
Nakagawa et al.

(10) Patent No.: US 9,751,776 B2
(45) Date of Patent: Sep. 5, 2017

(54) DISPERSION OF ZIRCONIUM OXIDE, PROCESS FOR PRODUCING THE SAME, AND RESIN COMPOSITION CONTAINING THE SAME

(75) Inventors: Kenichi Nakagawa, Sakai (JP); Takanori Morita, Sakai (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 1231 days.

(21) Appl. No.: 13/132,728

(22) PCT Filed: Nov. 26, 2009

(86) PCT No.: PCT/JP2009/070281
§ 371 (c)(1),
(2), (4) Date: Jun. 3, 2011

(87) PCT Pub. No.: WO2010/064664
PCT Pub. Date: Jun. 10, 2010

(65) Prior Publication Data
US 2011/0245397 A1 Oct. 6, 2011

(30) Foreign Application Priority Data
Dec. 4, 2008 (JP) ................................ 2008-309940

(51) Int. Cl.
*C01G 25/02* (2006.01)
*B82Y 30/00* (2011.01)
*C08K 3/22* (2006.01)

(52) U.S. Cl.
CPC .............. *C01G 25/02* (2013.01); *B82Y 30/00* (2013.01); *C01P 2002/54* (2013.01); *C01P 2004/62* (2013.01); *C01P 2004/64* (2013.01); *C01P 2006/22* (2013.01); *C01P 2006/40* (2013.01); *C01P 2006/60* (2013.01); *C08K 3/22* (2013.01)

(58) Field of Classification Search
CPC ....... C08K 3/22; C01G 25/02; C01P 2002/54; C01P 2004/64; C01P 2004/62; C01P 2006/22; C01P 2006/40; C01P 2006/60
USPC ..................................................... 516/33, 90
See application file for complete search history.

(56) References Cited

U.S. PATENT DOCUMENTS

| | | | | |
|---|---|---|---|---|
| 3,282,857 A | * | 11/1966 | Fitch | B82Y 30/00 516/90 |
| 5,094,691 A | * | 3/1992 | Watanabe | B82Y 30/00 106/286.4 |
| 5,124,303 A | * | 6/1992 | Kobayashi | B01D 53/9413 423/239.1 |
| 5,234,870 A | * | 8/1993 | Osaka | B01J 13/0021 516/29 |
| 2002/0004544 A1 | * | 1/2002 | Kolb et al. | 524/413 |
| 2004/0192790 A1 | * | 9/2004 | Chiang et al. | 516/78 |
| 2006/0148950 A1 | * | 7/2006 | Davidson et al. | 524/413 |
| 2008/0242745 A1 | * | 10/2008 | Morimura | 516/90 |
| 2009/0140284 A1 | * | 6/2009 | Kurino et al. | 257/100 |

FOREIGN PATENT DOCUMENTS

| | | |
|---|---|---|
| EP | 1 878 702 A1 * | 1/2006 |
| JP | 61-16809 | 1/1986 |
| JP | 5-24844 | 2/1993 |
| JP | 05024844 A * | 2/1993 |
| JP | 2006-143535 | 6/2006 |
| JP | 2006-143535 A * | 6/2006 |
| JP | 2008-31023 | 2/2008 |
| JP | 2008031023 A * | 2/2008 |
| WO | WO 2008/083282 A2 * | 7/2008 |

OTHER PUBLICATIONS

Machine Translation of Publ. No. JP 2008-031023, published Feb. 2008, Japan patent Office, Tokyo, Japan, obtained online @ http://dossier1.ipdl.inpit.go.jp/AIPN/odse_top_dn.ipdl?N0000=7400 (Downloaded Jun. 5, 2014).*
Machine Translation of Publ. No. JP H05-024844, published Feb. 1993, Japan patent Office, Tokyo, Japan, obtained online @ http://dossier1.ipdl.inpit.go.jp/AIPN/odse_top_dn.ipdl?N0000=7400 (Downloaded Jun. 5, 2014).*
Machine Translation of Publ. No. JP 2006-143535, published Jun. 2006, Japan patent Office, Tokyo, Japan, obtained online @ http://dossier1.ipdl.inpit.go.jp/AIPN/odse_top_dn.ipdl?N0000=7400 (Downloaded Oct. 20, 2014), pp. 1-21.*
Mizuno M, Sasaki Y, Lee S, Katakura H., "High-Yield sol-gel synthesis of well-dispersed, colorless ZrO2 Nanocrystals", Langmuir (Aug. 2006) 22(17): 7137-40, (Publ. Date (Web): Jul. 15, 2006).*
International Search Report dated Mar. 9, 2010 in International (PCT) Application No. PCT/JP2009/070281.

* cited by examiner

*Primary Examiner* — Daniel S Metzmaier
(74) *Attorney, Agent, or Firm* — Wenderoth, Lind & Ponack, L.L.P.

(57) ABSTRACT

The invention provides a dispersion of zirconium oxide having a content as high as 20% by weight or more, but a low viscosity, and having a high transparency, which has a transmittance of 35% or more at a wave length of 400 nm, a transmittance of 95% or more at a wave length of 800 nm, and a viscosity of 20 mPa·s or less at a temperature of 25° C. Such a dispersion of zirconium oxide can be obtained by reacting a zirconium salt with an alkali in water to obtain a slurry of particles of zirconium oxide; filtering, washing, and repulping the slurry; adding an organic acid to the resulting slurry in an amount of one mole part or more per mole part of the zirconium in the slurry; hydrothermally treating the slurry at a temperature of 170° C. or higher; and washing and concentrating the resulting aqueous dispersion of particles of zirconium oxide.

7 Claims, No Drawings

DISPERSION OF ZIRCONIUM OXIDE, PROCESS FOR PRODUCING THE SAME, AND RESIN COMPOSITION CONTAINING THE SAME

TECHNICAL FIELD

The present invention relates to a dispersion of zirconium oxide, a process for producing the same, and a resin composition containing the same, and particularly to a dispersion of zirconium oxide which has a high concentration but a low viscosity, and has a high transparency, a process for producing the same, and a resin composition containing the same. As the dispersion of zirconium oxide of the invention has the properties described above, it is particularly useful as, for example, a material for an optical composite resin, such as an LED sealing resin or an antireflection film.

BACKGROUND ART

Recently, various high-functional resins or films in which zirconium oxide is combined with a transparent resin or film to improve its refractive index by making use of the high refractive index of the zirconium oxide have been proposed.

For example, it is known that when zirconium oxide having a high refractive index is added to an LED sealing resin, the refractive index of the sealing resin can be heightened, and hence it is possible to further efficiently take out emission of light from illuminant, thus resulting in improved brightness of an LED.

Similarly, zirconium oxide is also used in an antireflection film on a display surface of a flat panel display (FPD) such as a liquid crystal display (LCD), a plasma display (PDP), or an electroluminescence display (EL). The antireflection film is a laminated film in which a layer having a low refractive index and a layer having a high refractive index are laminated, and a composite resin in which zirconium oxide is dispersed is used in the layer having a high refractive index.

In the uses described above, in the case a primary particle size of zirconium oxide and a secondary particle size of aggregated particles of zirconium oxide in a resin are not sufficiently smaller than a wave length of visible rays (380 to 800 nm), a sealing resin or an antireflection film becomes clouded due to an influence of scattering caused by the particles of zirconium oxide, and thus necessary transparency cannot be obtained. It is therefore strongly required to develop a highly transparent dispersion of zirconium oxide in which the particles of zirconium oxide are dispersed as fine particles in a resin.

In order to meet the requirement, various fine particles of zirconium oxide and processes for producing a dispersion of such fine particles have been recently proposed. A typical process for obtaining a dispersion of zirconium oxide is such that it makes use of zirconium hydroxide produced by neutralizing a zirconium salt with an alkali. For example, a process is known in which hydrochloric acid having a predetermined concentration is added to a slurry of zirconium hydroxide, and the resulting mixture is heated at a boiling temperature to obtain a dispersion of zirconium oxide (Patent Literature 1). According to this process, however, the obtained zirconium oxide has an average particle size of 50 nm or more, and therefore it is difficult that the dispersion has a satisfactory transparency.

A process is also known in which an aqueous solution of a zirconium salt is added to an aqueous solution of an alkali metal hydroxide which has been heated to 60° C. or more to neutralize the alkali metal hydroxide, that is, reverse neutralization is carried out; then the resulting product is filtered, and washed; and water is added to the product; the resulting mixture is stirred; an acid is added to the mixture; and the resulting mixture is stirred while it is heated at a temperature of 80 to 100° C. to obtain a dispersion of zirconia (Patent Literature 2). According to this process, however, a long heating time is necessary, and therefore it is difficult to adopt the process for industrial production of dispersion of zirconia.

A further process is known in which an aqueous solution of alkali is added to an aqueous solution of a zirconium salt in the presence of a carboxylic acid such as malic acid, citric acid, or tartaric acid to obtain a gel of zirconium hydroxide; the gel is washed, and sufficiently dispersed by ultrasonic wave irradiation, or the like; and the resulting dispersion is hydrothermally treated in the presence of the carboxylic acid mentioned above to obtain a dispersion of zirconium oxide (Patent Literature 3). According to this process, however, the concentration of the aqueous solution of zirconium salt is limited up to 5% by weight in terms of zirconia so that the obtained zirconia sol does not have an uneven particle size, and therefore, the obtained dispersion of zirconia has a remarkably low concentration. Furthermore, because it is essential to sufficiently perform the dispersion treatment by the ultrasonic wave irradiation or the like before the hydrothermal treatment in the process, it is difficult to adopt the process for an industrial process for production of dispersion of zirconia.

Patent Literature 1: JP 1993-24844 A
Patent Literature 2: JP 2008-31023 A
Patent Literature 3: JP 2006-143535 A

DISCLOSURE OF THE INVENTION

Technical Problems to be Solved

In order to solve the above-mentioned problems involved in the conventional dispersions of zirconium oxide, the present inventors have made studies diligently. As a result, they have found that when a zirconium salt is reacted with an alkali in water to obtain a slurry containing particles of zirconium oxide; the slurry is filtered, washed and repulped; an organic acid is added to the resulting slurry in an amount of one mole part or more per mole part of the zirconium in the slurry; and the slurry is hydrothermally treated at a temperature of 170° C. or higher; then an aqueous dispersion of zirconium oxide having an excellent transparency can be obtained.

The inventors have further found that when the dispersion obtained is washed and concentrated, an aqueous dispersion of zirconium oxide having a high transparency and a low viscosity can be obtained while the dispersion has a high content of 20% by weight or more.

Furthermore, the inventors have found that when the medium of the thus obtained aqueous dispersion of zirconium oxide, that is, water is replaced by an organic solvent, a dispersion of zirconium oxide the medium of which dispersion is the organic solvent, and which has a high transparency and a low viscosity can be obtained, while the dispersion has a high content of particles of zirconium oxide of 20% by weight or more, similarly as above. Thus, the inventors have accomplished the present invention.

Therefore, it is an object of the invention to provide a dispersion of zirconium oxide having a low viscosity and a high transparency, while the dispersion has a high content of 20% by weight or more, and a process for producing such a dispersion of zirconium oxide. It is also an object of the invention to provide a resin composition containing such a dispersion of zirconium oxide.

Means to Solve the Problems

The invention provides a dispersion of zirconium oxide comprising particles of zirconium oxide in a content of 20% by weight or more and having a transmittance of 35% or more at a wave length of 400 nm, a transmittance of 95% or more at a wave length of 800 nm, and a viscosity of 20 mPa·s or less at a temperature of 25° C.

Herein the invention, a dispersion medium of the dispersion of zirconium oxide is water, an organic solvent, or a mixture thereof.

According to the invention, a zirconium salt is reacted with an alkali in water to obtain a slurry containing particles of zirconium oxide; the slurry is filtered, washed, and repulped; an organic acid is added to the resulting slurry in an amount of one mole part or more per mole part of the zirconium in the slurry; the slurry is hydrothermally treated at a temperature of 170° C. or higher to obtain an aqueous dispersion of particles of zirconium oxide; and the dispersion is washed and concentrated, thereby obtaining an aqueous dispersion of zirconium oxide having a content of particles of zirconium oxide of 20% by weight or more, which has the properties mentioned above, that is, a transmittance of 35% or more at a wave length of 400 nm, a transmittance of 95% or more at a wave length of 800 nm, and a viscosity of 20 mPa·s or less at a temperature of 25° C.

Further according to the invention, a zirconium salt and a salt of at least one stabilizing element selected from aluminum, magnesium, titanium, and rare earth elements are reacted with an alkali in water to obtain a slurry of particles of a coprecipitate of zirconium oxide and the at least one stabilizing element; the slurry is filtered, washed, and repulped; an organic acid is added to the resulting slurry in an amount of one mole part or more per mole part of a total amount of the zirconium and the at least one stabilizing element in the slurry; the slurry is hydrothermally treated at a temperature of 170° C. or higher; and the resulting aqueous dispersion of solid solution of zirconium oxide containing the at least one stabilizing element is washed and concentrated, thereby an aqueous dispersion of solid solution of zirconium oxide containing the at least one stabilizing element, which has the properties described above can be obtained.

In the invention, the coprecipitate of zirconium oxide and the at least one stabilizing element refers to a coprecipitate of zirconium oxide and a neutralization product of a salt of the at least one stabilizing element obtained by reacting a zirconium salt and a salt of the at least one stabilizing element with an alkali in water.

In addition, according to the invention, a dispersion medium of such an aqueous dispersion of zirconium oxide as obtained above, that is, water is replaced by an organic solvent, thereby a dispersion of zirconium oxide of which dispersion medium is the organic solvent and which has the properties described above can be obtained.

Effect of the Invention

The dispersion of zirconium oxide of the invention has a low viscosity while it has a high concentration, and further it has a high transparency. Therefore, when it is used in, for example, an optical product such as an LED sealing resin or an antireflection film, the dispersion can be added to a resin as it is of a high concentration, that is, a large amount of zirconium oxide can be added to a resin, thereby readily providing a composite resin having a high refractive index and an excellent transparency.

Furthermore, according to the process of the invention, as described above, a dispersion of zirconium oxide having a high content and yet a low viscosity, as well as a high transparency can be easily obtained.

BEST MODE FOR CARRYING OUT THE INVENTION

The dispersion of zirconium oxide of the invention has a transmittance of 35% or more at a wave length of 400 nm, a transmittance of 95% or more at a wave length of 800 nm, and a viscosity of 20 mPa·s or less, preferably 10 mPa·s or less, at a temperature of 25° C.

In the dispersion of zirconium oxide of the invention, the zirconium oxide may be solid solution of zirconium oxide containing at least one stabilizing element selected from aluminum, magnesium, titanium, and rare earth elements, that is, the zirconium oxide may be a so-called stabilized zirconium oxide in order to keep crystal stability to heat. Examples of the rare earth element may include yttrium.

First, the process for producing the aqueous dispersion of zirconium oxide according to the invention will be explained.

According to the process of the invention for producing an aqueous dispersion of zirconium oxide, a zirconium salt is reacted with an alkali in water to obtain a slurry of particles of zirconium oxide; then the slurry is filtered, washed, and repulped; an organic acid is added to the resulting slurry in an amount of one mole part or more per mole part of the zirconium in the slurry; the slurry is hydrothermally treated at a temperature of 170° C. or higher; and the resulting aqueous dispersion of zirconium oxide is washed and concentrated.

According to the process of the invention for producing an aqueous dispersion of solid solution of zirconium oxide containing at least one stabilizing element selected from aluminum, magnesium, titanium, and rare earth elements, a zirconium salt and a salt of the at least one stabilizing element mentioned above are reacted with an alkali to obtain a slurry of particles of a coprecipitate of zirconium oxide and the at least one stabilizing element; the slurry is filtered, washed, and repulped; an organic acid is added to the resulting slurry in an amount of one mole part or more per mole part of a total amount of the zirconium and the at least one stabilizing element in the slurry; the slurry is hydrothermally treated at a temperature of 170° C. or higher, and the resulting aqueous dispersion is washed and concentrated.

The zirconium salt used in the invention is not particularly limited, and a water soluble salt such as a nitrate, an acetate and a chloride is used. Of these salts, zirconium oxychloride is preferably used as the zirconium salt. As the alkali, sodium hydroxide, potassium hydroxide, and ammonia are preferably used, but the alkali is not limited thereto.

The salt of the at least one stabilizing element is not particularly limited, and a water soluble salt such as a chloride and a nitrate is usually used. For example, when the at least one stabilizing element is aluminum, aluminum chloride is preferably used; and when the at least one stabilizing element is yttrium, yttrium chloride is preferably used. The at least one stabilizing element is usually used in an amount of 1 to 20% by mole based on the zirconium element.

A temperature at which the zirconium salt, or the zirconium salt and the salt of the at least one stabilizing element are reacted with the alkali in water is not also particularly limited, and the temperature is usually within a range of 10 to 50° C., preferably within a range of 15 to 40° C. A method for reacting the zirconium salt, or the zirconium salt and the salt of the at least one stabilizing element with the alkali in water may include, for example, a method in which an aqueous solution of alkali is added to an aqueous solution of zirconium salt or to a mixed aqueous solution of the zirconium salt and the salt of the at least one stabilizing element; a method in which the zirconium salt or a mixed aqueous solution of the zirconium salt and the salt of the at least one stabilizing element is added to an aqueous solution of alkali; a method in which an aqueous solution of zirconium salt or a mixed aqueous solution of the zirconium salt and the salt of the stabilizing element, and an aqueous solution of alkali are added to charged water (water which has been previously put in a precipitation reactor) at the same time, that is, a simultaneous neutralization method; and the like. Any of these methods described above may be employed. Of these, the simultaneous neutralization method in which the aqueous solution of zirconium salt or the mixed aqueous solution of the zirconium salt and the salt of the at least one stabilizing element, and the aqueous solution of alkali are added to charged water at the same time is preferable.

The aqueous solution of zirconium salt, for example, the aqueous solution of zirconium oxychloride has preferably a concentration of 2.4 moles/L or less. The aqueous solution of alkali has preferably a concentration of 10 moles/L or less.

According to the invention, as described above, the zirconium salt, or the zirconium salt and the salt of the at least one stabilizing element is/are reacted with the alkali in water thereby a slurry of the particles of zirconium oxide, or a slurry of the particles of a coprecipitate of the zirconium oxide and the at least one stabilizing element is obtained, and then the slurry is filtered, washed, and repulped in water to prepare a second slurry. The thus obtained second slurry has preferably an electric conductivity of 500 μS/cm or less.

In general, when the zirconium salt, for example, zirconium oxychloride is neutralized with, for example, sodium hydroxide in water, a salt or sodium chloride is produced as a by-product. When the salt, for example, sodium chloride by-produced by the reaction of the zirconium salt with the alkali in water is not sufficiently removed from the second slurry, even if the organic acid is added to such a slurry, and the slurry is hydrothermally treated, it is difficult to obtain a satisfactory dispersion effect, and thus a dispersion of zirconium oxide having a high transparency cannot be obtained.

Further according to the invention, in order to obtain the slurry by filtering and washing the previously obtained slurry and repulping the resulting cake in water, the cake may be poured into water and the mixture may be stirred in a stirrer to obtain the slurry. Alternatively, the cake may be repulped in water by a wet media dispersion means such as a beads mill, ultrasonic wave irradiation, or a device such as a high pressure homogenizer, as occasion demands.

As described above, the zirconium salt, or the zirconium salt and the salt of the at least one stabilizing element is/are reacted with the alkali in water thereby providing the slurry of particles of zirconium oxide, or particles of the coprecipitate of the zirconium oxide and the at least one stabilizing element, which usually has a content of 1 to 20% by weight of the particles. When the slurry has a content of the particles of zirconium oxide, or a content of particles of the coprecipitate of the zirconium oxide and the at least one stabilizing element of more than 20% by weight, the viscosity of the slurry is high, and therefore it is difficult to stir the slurry, thus resulting in insufficient washing. When such a slurry is used, the desired dispersion of zirconium oxide having a high transparency and a low viscosity cannot be obtained. In the invention, the content of the particles of zirconium oxide, or the content of the particles of the coprecipitate of the zirconium oxide and the at least one stabilizing element in the slurry is particularly preferably within a range of 1 to 10% by weight.

According to the invention, as set forth above, either the zirconium salt is reacted with the alkali in water thereby obtaining the slurry containing the particles of zirconium oxide, or the zirconium salt and the salt of the at least one stabilizing element are reacted with the alkali in water thereby obtaining the slurry containing the particles of the coprecipitate of the zirconium oxide and the at least one stabilizing element; then the slurry is filtered, washed, and repulped in water; an organic acid is added to the resulting slurry in an amount of one mole part or more per mole part of the zirconium, or per mole part of the total amount of the zirconium and the at least one stabilizing element in the slurry; and the slurry is hydrothermally treated at a temperature of 170° C. or higher.

The slurry to be subjected to the hydrothermal treatment has also a content of particles of zirconium oxide, or a content of particles of the coprecipitate of the zirconium oxide and the at least one stabilizing element of usually 1 to 20% by weight, preferably 1 to 10% by weight. When the content of the particles of zirconium oxide, or the content of the particles of the coprecipitate of the zirconium oxide and the at least one stabilizing element in the slurry is more than 20% by weight, the slurry has a high viscosity, and it is difficult to perform the hydrothermal treatment. Therefore, the content of the particles of zirconium oxide, or the content of the particles of the coprecipitate of the zirconium oxide and the at least one stabilizing element in the slurry is particularly preferably within a range of 1 to 10% by weight.

The organic acid is used in order to disperse the particles of zirconium oxide, or the particles of the coprecipitate of the zirconium oxide and the at least one stabilizing element in the slurry by making the particles to electrically repel each other, in other words, in order to perform acid deflocculation. In particular, according to the invention, the slurry is hydrothermally treated under severe conditions, and therefore the particles of zirconium oxide, or the particles of the coprecipitate of the zirconium oxide and the at least one stabilizing element are more effectively deflocculated.

As the organic acid, a carboxylic acid and a hydroxycarboxylic acid are preferably used, and the salts of the carboxylic acid or the hydroxycarboxylic acid may also be used. Examples of the organic acid may include monocarboxylic acids such as formic acid, acetic acid and propionic acid, and the salts thereof; polybasic acids such as oxalic acid, malonic acid, succinic acid, fumaric acid and maleic acid, and the salts thereof; and hydroxycarboxylic acids such as lactic acid, malic acid, tartaric acid, citric acid and gluconic acid, and the salts thereof. As the salt of the carboxylic acid or the hydroxycarboxylic acid, for example, alkali metal salts such as sodium salts and potassium salts are preferably used.

As mentioned hereinbefore, the organic acid is usually used in an amount of one mole part or more per mole part of the zirconium, or the total amount of the zirconium and the at least one stabilizing element in the slurry to be hydrothermally treated. The amount is preferably from 1 to 5 mole parts, most preferably from 1 to 3 mole parts. When the amount of the organic acid is less than one mole part per mole part of the zirconium, or the total amount of the zirconium and the at least one stabilizing element in the slurry, the resulting aqueous dispersion of zirconium oxide not only has an insufficient transparency but also may have a high viscosity. On the other hand, when the amount of the organic acid is more than 5 mole parts per mole part of the zirconium, or the total amount of the zirconium and the at least one stabilizing element in the slurry, an effect which reflects the large amount used cannot be particularly obtained, and it is not economical.

According to the invention, the slurry of zirconium oxide containing the organic acid, or the slurry of the particles of zirconium oxide and the particles of the coprecipitate of the zirconium oxide and the at least one stabilizing element containing the organic acid is subsequently hydrothermally treated. The hydrothermal treatment is performed at a temperature of usually 170° C. or higher, preferably 170° C. to 230° C. When the hydrothermal treatment is performed at a temperature of less than 170° C., the resulting aqueous dispersion of zirconium oxide does not have a satisfactory transparency, and in addition, it contains coarse, sedimentary and aggregated particles, and may have a high viscosity.

The hydrothermal treatment time is usually one hour or more, preferably 3 hours or more. When the hydrothermal treatment time is shorter than one hour, the resulting aqueous dispersion of zirconium oxide does not have a sufficient transparency, and in addition, coarse, sedimentary and aggregated particles are generated therein, and thus the desired aqueous dispersion of fine particles of zirconium oxide with a high transparency cannot be obtained. Longer hydrothermal treatment times are possible, but an effect which reflects the time spent cannot be obtained, and thus it usually is enough to perform the treatment for 10 hours or shorter.

In order to wash the thus obtained aqueous dispersion of zirconium oxide, a method such as an ion exchange using an ion exchange resin, a diffusion dialysis using a semipermeable membrane, an electrodialysis, or an ultrafiltration using an ultrafilter may be employed. In the invention, the method is not particularly limited; however, of these, it is preferable to wash the dispersion by the ultrafiltration using an ultrafilter.

In order to concentrate the thus washed aqueous dispersion of zirconium oxide, a method such as evaporative concentration using a rotary evaporator, or concentration by ultrafiltration using an ultrafilter may be employed. In the invention, the concentration method is not also particularly limited, and it is preferable to concentrate the dispersion by the ultrafiltration using an ultrafilter.

According to the invention, it is particularly preferable to wash the aqueous dispersion of zirconium oxide obtained by the hydrothermal treatment at the same time when it is concentrated using the ultrafilter. That is, the aqueous dispersion is concentrated by the ultrafiltration, the resulting concentrated liquid is diluted with water and washed, and the resulting slurry is subjected to the ultrafiltration again. In this way, the procedure of the concentration by the ultrafiltration and dilution of the aqueous dispersion is repeated, whereby the aqueous dispersion of zirconium oxide obtained by the hydrothermal treatment is concentrated while remaining salts produced as the by-products are repeatedly removed together with water. Thus, the aqueous dispersion of zirconium oxide having a content of zirconium oxide of 20% by weight or more, a high transparency, and a low viscosity can be obtained. In the invention, the aqueous dispersion of zirconium oxide has an upper limit of the amount of the zirconium oxide of 50% by weight, preferably 40% by weight. An aqueous dispersion having a content of the zirconium oxide of more than 50% by weight has a high viscosity, and it finally loses fluidity to cause gelation.

According to the invention, the aqueous dispersion of zirconium oxide of which dispersion medium is water can be obtained in this way. When the dispersion medium of the aqueous dispersion thus obtained is replaced by an organic solvent, a dispersion of zirconium oxide of which dispersion medium is the organic solvent, and which has the properties described above, that is, a transmittance of 35% or more at a wave length of 400 nm, a transmittance of 95% or more at a wave length of 800 nm, and a viscosity of 20 mPa·s or less at a temperature of 25° C. can be obtained.

Accordingly, the dispersion medium of the dispersion of zirconium oxide may be water, the organic solvent, or the mixture thereof in the invention.

The organic solvent is not particularly limited, and water miscible organic solvents are preferable. The water miscible organic solvent is not particularly limited, and may include, for example, aliphatic alcohols such as methanol, ethanol, and 2-propanol; aliphatic carboxylic acid esters such as ethyl acetate and methyl formate; aliphatic ketones such as acetone, methyl ethyl ketone, and methyl isobutyl ketone; polyhydric alcohols such as ethylene glycol and glycerin; and mixtures of the two or more thereof. Methanol, methyl ethyl ketone, methyl isobutyl ketone, and mixtures thereof are particularly preferable.

In order to displace the dispersion medium of the aqueous dispersion of zirconium oxide obtained, that is water, by the organic solvent, the aqueous dispersion is treated using a rotary evaporator to remove water, and the organic solvent is newly added thereto, for example. As an another method, the aqueous dispersion is subjected to ultrafiltration to remove water or the dispersion medium, to obtain a slurry, the slurry is diluted with an organic solvent, and the ultrafiltration is performed again. In this way, the procedure of filtration and dilution is repeated, whereby water, which is the original dispersion medium, is replaced by the organic solvent, and thus the dispersion of zirconium oxide whose dispersion medium is the organic solvent can be obtained.

As a further method, for example, water which is a dispersion medium of an aqueous dispersion of zirconium oxide is replaced by a water miscible organic solvent to obtain a dispersion of zirconium oxide of which dispersion medium is the water miscible organic solvent, and then the water miscible organic solvent is replaced by another organic solvent, whereby a dispersion of zirconium oxide of which dispersion medium is the another organic solvent can be obtained.

The thus obtained dispersion of zirconium oxide may further be subjected to a wet media dispersion such as a beads mill, ultrasonic wave irradiation, or a dispersion treatment using a high pressure homogenizer, as occasion demands.

The resin composition of the invention is obtained by uniformly dispersing the dispersion of zirconium oxide of the invention described above in a resin. The zirconium oxide is added to the resin in an amount usually of 5 to 350 parts by weight relative to 100 parts by weight of the resin, although the amount depends on the use or required properties of the obtained resin composition.

In the invention, the resin described above is not particularly limited, and it may be appropriately selected depending on the use or required properties of the obtained resin composition. Examples thereof may include polyolefin resins, which are homopolymers or copolymers of an olefin, such as polyethylene, polypropylene, an ethylene-propylene copolymer, an ethylene-propylene-diene terpolymer, ethylene-butene copolymer, ethylene-acrylic ester (such as ethyl acrylate) copolymer, ethylene-vinyl acetate copolymer, and ethylene-methyl methacrylate copolymer; homopolymers of an aromatic vinyl monomer such as styrene, and copolymers thereof such as an ABS resin; poly(meth)acrylic resins; polyesters such as polyethylene terephthalate, polybutylene terephthalate, and polyarylate; polyamides such as 6-nylon, 6,6-nylon, 12-nylon, 46-nylone, and aromatic polyamides; polyethers such as polyphenylene ether, modified polyphenylene ether, and polyoxymethylene; polycarbonates; elastomers such as styrene-conjugated diene copolymer, polybutadiene, polyisoprene, acrylonitrile-butadiene copolymer, and polychloroprene; polyvinyl chloride; cross-linked polymers obtained by polymerizing and cross-linking a polyfunctional (meth)acrylate or a cross-linkable composition containing the same; and the like. If necessary, a thermosetting resin such as a phenol resin, an epoxy resin, an unsaturated polyester, or a polyurethane, or a silicone resin may be used. These resins may be used alone or as a mixture of two or more.

The resin composition containing the zirconium oxide of the invention may be appropriately admixed with other additives depending on the resin used, if necessary, in addition to the zirconium oxide described above. The additive may include a plasticizer, a lubricant, filler, an antioxidant, a thermal stabilizer, a nucleating agent, a cross linking agent, a cross linking aid, a coupling agent, an antistatic agent, a compatibilizer, a light resisting agent, a pigment, a foaming agent, an antifungal agent, and the like.

The resin composition can be obtained by mixing the dispersion of zirconium oxide described above with the resin, and kneading the mixture in an appropriate method such as stirring and mixing or by using an appropriate machine such as a single screw extruder, a twin screw extruder, a roll kneader, a kneader, a Banbury mixer, a ball mill, or a beads mill. The thus obtained resin composition of the invention can be preferably used for producing various molded articles by using an appropriate method such as injection molding, extrusion molding, blow molding, press molding, vacuum molding, calendar molding, transfer molding, lamination molding, molding using a die or solution film forming method, depending on the use or object.

EXAMPLES

The invention will be described with reference to Examples below, but the invention is not limited thereto.

Hereinafter in Examples, "Microza" (ACP-0013, a fractional molecular weight of 13000) manufactured by Asahi Kasei Chemicals Corporation was used for ultrafiltration.

A dispersion size of dispersion of zirconium oxide was measured in accordance with a dynamic light scattering method (using UPA-UT manufactured by Nikkiso Co., Ltd.). Here, the dispersion size refers to a size (a diameter) of particles dispersed in dispersion. A transmittance of dispersion of zirconium oxide was measured by putting the dispersion in a cell having a light path length of 10 mm, and using a visible-ultraviolet spectrophotometer (V-570 manufactured by JASCO Corporation). A viscosity of dispersion of zirconium oxide was measured using a turning-fork vibration SV viscometer (SV-1A manufactured by A & D Company, limited).

A total light transmittance and a haze value of a film formed of a resin composition were measured using a haze meter (NDH 2000 manufactured by Nippon Denshoku Industries Co., Ltd.), and a scratch hardness thereof was measured in accordance with a scratch hardness method (Pencil Method) defined in JIS K 5600-5-4 (1999).

Example 1

(Dispersion of Zirconium Oxide A)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide having a concentration of 1.9 moles/L were prepared. The mixed aqueous solution of the zirconium oxychloride and the yttrium chloride, and the aqueous solution of the sodium hydroxide were poured at the same time into a precipitation reactor into which 0.74 L of pure water had been in advance put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of zirconium oxide and yttrium oxide. The slurry had an electric conductivity of 235 µS/cm.

86.3 g (3 mole parts per mole part of total amount of the zirconium and the yttrium in the slurry) of acetic acid was added to the slurry, and the mixture was hydrothermally treated at 200° C. for 3 hours to obtain a translucent dispersion. The translucent dispersion was washed and concentrated using an ultrafilter to obtain a dispersion A having a content of 30% by weight of solid solution of zirconium oxide containing yttrium.

(Dispersion of Zirconium Oxide B)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide having a concentration of 1.9 moles/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of zirconium oxide and yttrium oxide. The slurry had an electric conductivity of 235 µS/cm.

86.3 g (3 mole parts per mole part of total amount of the zirconium and the yttrium in the slurry) of acetic acid was added to the slurry, and the mixture was hydrothermally treated at 230° C. for 3 hours to obtain a translucent dispersion. The translucent dispersion was washed and concentrated using an ultrafilter to obtain a dispersion B having a content of 30% by weight of solid solution of zirconium oxide containing yttrium.

(Dispersion of Zirconium Oxide C)

0.76 L of an aqueous solution of zirconium oxychloride in a concentration of 0.6 mole/L and 0.53 L of an aqueous solution of sodium hydroxide having a concentration of 1.7 moles/L were prepared. The aqueous solution of the zirconium oxychloride and the aqueous solution of the sodium hydroxide were poured at the same time into a precipitation reactor into which 0.74 L of pure water had been put, thereby the zirconium oxychloride was neutralized, and thus a slurry of particles of zirconium oxide was obtained. The slurry was filtered, washed, and repulped in pure water so that one liter of a slurry was obtained of which solid content of zirconium oxide was 5.6% by weight. The slurry had an electric conductivity of 258 μS/cm.

82.2 g (3 mole parts per mole part of the zirconium in the slurry) of acetic acid was added to the slurry, and the mixture was hydrothermally treated at 200° C. for 3 hours to obtain a translucent dispersion. The translucent dispersion was washed and concentrated using an ultrafilter to obtain a dispersion C having a content of 30% by weight of zirconium oxide.

(Dispersion of Zirconium Oxide D)

0.76 L of a mixed aqueous solution of zirconium oxychloride in a concentration of 0.6 mole/L and aluminum chloride in a concentration of 0.03 mole/L, as well as 0.53 L of an aqueous solution of sodium hydroxide having a concentration of 1.9 moles/L were prepared. The mixed aqueous solution of the zirconium oxychloride and the aluminum chloride, and the aqueous solution of the sodium hydroxide were poured at the same time into a precipitation reactor into which 0.74 L of pure water had been put, thereby the zirconium oxychloride and the aluminum chloride were neutralized at the same time to be coprecipitated, and thus a slurry of particles of a coprecipitate of the zirconium oxide and the aluminum was obtained. The slurry was filtered, washed, and repulped in pure water so that one liter of a slurry was obtained of which solid content was 5.5% by weight in terms of zirconium oxide and aluminum oxide. The slurry had an electric conductivity of 173 μS/cm.

86.3 g (3 mole parts per mole part of total amount of the zirconium and the aluminum in the slurry) of acetic acid was added to the slurry, and the mixture was hydrothermally treated at 200° C. for 3 hours to obtain a translucent dispersion. The translucent dispersion was washed and concentrated using an ultrafilter to obtain a dispersion of 30% by weight content of solid solution of zirconium oxide containing aluminum. The dispersion was further subjected to wet media dispersion treatment to obtain a dispersion D having a content of 30% by weight of solid solution of zirconium oxide containing aluminum.

(Dispersion of Zirconium Oxide E)

0.76 L of a mixed aqueous solution of zirconium oxychloride in a concentration of 0.6 mole/L and magnesium chloride in a concentration of 0.03 mole/L, as well as 0.53 L of an aqueous solution of sodium hydroxide having a concentration of 1.8 moles/L were prepared. The mixed aqueous solution of the zirconium oxychloride and the magnesium chloride, and the aqueous solution of the sodium hydroxide were poured at the same time into a precipitation reactor into which 0.74 L of pure water had been put, thereby the zirconium oxychloride and the magnesium chloride were neutralized at the same time to be coprecipitated, and thus a slurry of particles of a coprecipitate of the zirconium oxide and the magnesium was obtained. The slurry was filtered, washed, and repulped in pure water so that one liter of a slurry was obtained of which solid content was 5.5% by weight in terms of zirconium oxide and magnesium oxide. The slurry had an electric conductivity of 156 μS/cm.

86.3 g (3 mole parts per mole part of total amount of the zirconium and the magnesium in the slurry) of acetic acid was added to the slurry, and the mixture was hydrothermally treated at 200° C. for 3 hours to obtain a cloudy dispersion. The cloudy dispersion was washed and concentrated using an ultrafilter to obtain a dispersion having a content of 30% by weight of solid solution of zirconium oxide containing magnesium. The dispersion was further subjected to wet media dispersion treatment to obtain a dispersion E having a content of 30% by weight of zirconium oxide.

(Dispersion of Zirconium Oxide F)

0.76 L of a mixed aqueous solution of zirconium oxychloride in a concentration of 0.6 mole/L and titanium tetrachloride in a concentration of 0.03 mole/L, as well as 0.53 L of an aqueous solution of sodium hydroxide having a concentration of 1.9 moles/L were prepared. The mixed aqueous solution of the zirconium oxychloride and the titanium tetrachloride, and the aqueous solution of the sodium hydroxide were poured at the same time into a precipitation reactor into which 0.74 L of pure water had been put, thereby the zirconium oxychloride and the titanium tetrachloride were neutralized at the same time to be coprecipitated, and thus a slurry of particles of a coprecipitate of the zirconium oxide and the titanium was obtained. The slurry was filtered, washed, and repulped in pure water so that one liter of a slurry was obtained of which solid content was 5.5% by weight in terms of zirconium oxide and titanium oxide. The slurry had an electric conductivity of 392 μS/cm.

86.3 g (3 mole parts per mole part of total amount of the zirconium and the titanium in the slurry) of acetic acid was added to the slurry, and the mixture was hydrothermally treated at 200° C. for 3 hours to obtain a cloudy dispersion. The cloudy dispersion was washed and concentrated using an ultrafilter to obtain a dispersion of a content of 30% by weight of solid solution of zirconium oxide containing titanium. The dispersion was further subjected to wet media dispersion treatment to obtain a dispersion F having a content of 30% by weight of zirconium oxide.

(Dispersion of Zirconium Oxide G)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide having a concentration of 1.9 moles/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of zirconium oxide and yttrium oxide. The slurry had an electric conductivity of 235 μS/cm.

140.8 g (1 mole part per mole part of total amount of the zirconium and the yttrium in the slurry) of sodium citrate dihydrate was added to the slurry, and the mixture was hydrothermally treated at 200° C. for 3 hours to obtain a translucent dispersion. The translucent dispersion was washed and concentrated using an ultrafilter to obtain a dispersion G having a content of 30% by weight of solid solution of zirconium oxide containing yttrium.

(Dispersion of Zirconium Oxide H)

The dispersion of zirconium oxide A having a content of 30% by weight of zirconium oxide was diluted with methanol to a content of 15% by weight of zirconium oxide, and concentrated again using an ultrafilter to a content of 30% by weight of zirconium oxide. The dilution and concentration procedure were repeated five times to obtain a dispersion H of which dispersion medium was methanol and which had a content of 30% by weight of zirconium oxide.

(Dispersion of Zirconium Oxide I)

The dispersion of zirconium oxide H having a content of 30% by weight of zirconium oxide was diluted with methyl ethyl ketone to a content of 15% by weight of zirconium oxide, and concentrated again using a rotary evaporator to a content of 30% by weight of zirconium oxide. The dilution and concentration procedure were repeated five times, and the dispersion thus obtained was subjected to wet media dispersion treatment, thereby to obtain a dispersion I of which dispersion medium was methyl ethyl ketone and which had a content of 30% by weight of zirconium oxide.

Comparative Example 1

(Dispersion of Zirconium Oxide I)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 µS/cm.

86.3 g (3 mole parts per mole part of total amount of the zirconium and the yttrium in the slurry) of acetic acid was added to the slurry, and the mixture was hydrothermally treated at 150° C. for 3 hours to obtain a translucent dispersion.

It was tried to wash and concentrate the translucent dispersion using an ultrafilter to a content of 30% by weight, but the dispersion gelled when it came to have a content of 20% by weight of solid solution of zirconium oxide containing yttrium.

(Dispersion of Zirconium Oxide II)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 µS/cm.

14.4 g (0.5 mole parts per mole part of total amount of the zirconium and the yttrium in the slurry) of acetic acid was added to the slurry, and the mixture was hydrothermally treated at 200° C. for 3 hours to obtain a cloudy dispersion. The cloudy dispersion was washed and concentrated using an ultrafilter to obtain a dispersion having a content of 13% by weight of solid solution of zirconium oxide containing yttrium. The dispersion was further subjected to wet media dispersion treatment to obtain a dispersion II having a content of 13% by weight of zirconium oxide.

(Dispersion of Zirconium Oxide III)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and rep ulped in pure water so that one liter of a slurry was obtained of which solid content was 5.6% by weight in terms of the zirconium oxide and the yttrium oxide. The slurry had an electric conductivity of 235 µS/cm.

140.8 g (1 mole part per mole part of total amount of the zirconium and the yttrium in the slurry) of sodium citrate dihydrate was added to the slurry, and the mixture was hydrothermally treated at 150° C. for 3 hours to obtain a cloudy and sedimentary slurry. The slurry was washed and concentrated using an ultrafilter so that it had a content of 10% by weight of solid solution of zirconium oxide containing yttrium. The resulting was further subjected to wet media dispersion treatment to obtain a dispersion III having a content of 10% by weight of zirconium oxide.

(Dispersion of Zirconium Oxide IV)

0.76 L of a mixed aqueous solution of zirconium oxychloride in a concentration of 0.6 mole/L and yttrium chloride in a concentration of 0.03 mole/L, as well as 0.53 L of an aqueous solution of sodium hydroxide in a concentration of 1.9 mole/L were prepared. The mixed aqueous solution of the zirconium oxychloride and the yttrium chloride, and the aqueous solution of the sodium hydroxide were poured at the same time into a precipitation reactor into which 0.74 L of pure water had been put, thereby the zirconium oxychloride and the yttrium chloride were neutralized at the same time to be coprecipitated, and thus a slurry of particles of a coprecipitate of the zirconium oxide and the yttrium was obtained. The slurry was filtered, washed, and repulped in pure water so that one liter of a slurry was obtained of which solid content was 5.6% by weight in terms of the zirconium oxide and the yttrium oxide. The slurry had an electric conductivity of 235 µS/cm.

70.4 g (0.5 mole parts per mole part of total amount of the zirconium and the yttrium in the slurry) of sodium citrate dihydrate was added to the slurry, and the mixture was hydrothermally treated at 200° C. for 3 hours to obtain a cloudy dispersion. The cloudy dispersion was washed and concentrated using an ultrafilter so that it had a content of 30% by weight of solid solution of zirconium oxide containing yttrium. The resulting dispersion was further subjected to wet media dispersion treatment to obtain a dispersion IV having a content of 30% by weight of zirconium oxide.

Transmittances and viscosities of dispersions of zirconium oxide A to I of the invention are shown in Table 1, and transmittances and viscosities of dispersions of zirconium oxide I to IV of Comparative Example are shown in Table 2.

In Table 1 and Table 2, a particle size distribution D50 shows a particle size of a particle at which 50% by volume of particles were accumulated from the smallest particle side in a volume based particle size distribution, and a particle size distribution Dmax shows a maximum particle size obtained in a volume based particle size distribution.

TABLE 1

| | Example 1 | | | | | | | | |
|---|---|---|---|---|---|---|---|---|---|
| | A | B | C | D | E | F | G | H | I |
| Production of Dispersion | | | | | | | | | |
| Stabilizing element | Y | Y | None | Al | Mg | Ti | Y | Y | Y |
| Dispersion medium | Water | Water | Water | Water | Water | Water | Water | Methanol | Methyl ethyl ketone |
| Organic acid | Acetic acid | Acetic acid | Acetic acid | Acetic acid | Acetic acid | Acetic acid | Sodium citrate | Acetic acid | Acetic acid |
| Amount of organic acid (mole part)[1] | 3 | 3 | 3 | 3 | 3 | 3 | 1 | 3 | 3 |
| Hydrothermal treating temperature (° C.) | 200 | 230 | 200 | 200 | 200 | 200 | 200 | 200 | 200 |
| Properties of Dispersion | | | | | | | | | |
| Content of zirconium oxide (% by weight) | 30 | 30 | 30 | 30 | 30 | 30 | 30 | 30 | 30 |
| Particle size distribution D50 (nm) | 8.4 | 7.4 | 5.2 | 2.9 | 4.4 | 3.2 | 5.4 | 3.1 | 8.6 |
| Particle size distribution Dmax (nm) | 21.5 | 25.6 | 21.5 | 25.6 | 30.4 | 30.4 | 21.5 | 25.6 | 36.1 |
| Transmittance at wave length of 800 nm (%) | 98.2 | 97.1 | 95.8 | 96.9 | 96.3 | 95.5 | 96.1 | 96.,8 | 95.3 |
| Transmittance at wave length of 400 nm (%) | 44.3 | 43.6 | 42.8 | 43.6 | 43.0 | 41.7 | 43.3 | 42.7 | 39.2 |
| Viscosity at 25° C. (mPa · s) | 8.0 | 9.4 | 5.3 | 8.0 | 9.2 | 9.5 | 3.9 | 4.8 | 15.7 |

(Notes)
[1]Mole parts per mole part of zirconium (and stabilizing element)

TABLE 2

| | Comparative Example 1 | | | |
|---|---|---|---|---|
| | I | II | III | IV |
| Production of Dispersion | | | | |
| Stabilizing element | Y | Y | Y | Y |
| Dispersion medium | Water | Water | Water | Water |
| Organic acid | Acetic acid | Acetic acid | Sodium citrate | Sodium citrate |
| Amount of organic acid (mole part)[1] | 3 | 0.5 | 1 | 0.5 |
| Hydrothermal treating temperature (° C.) | 150 | 200 | 150 | 200 |
| Properties of Dispersion | | | | |
| Content of zirconium oxide (% by weight) | 20 | 13 | 10 | 30 |
| Particle size distribution D50 (nm) | a | 143.3 | b | 15.4 |
| Particle size distribution Dmax (nm) | a | 179.5 | b | 60.8 |
| Transmittance at wave length of 800 nm (%) | 54.8 | 5.6 | 0.0 | 68.6 |
| Transmittance at wave length of 400 nm (%) | 2.2 | 0.0 | 0.0 | 0.1 |
| Viscosity at 25° C. (mPa · s) | Gelled | 5.8 | 4.5 | 8.0 |

(Notes)
[1]Mole part per mole part of zirconium (and stabilizing element)
[2]"a" means that measurement was not possible because a dispersion was gelled; and "b" means that measurement was not possible because a dispersion size of dispersion was too large.

Example 2

(Preparation of Resin Composition Containing Zirconium Oxide and Evaluation of Properties Thereof)

A coating composition was prepared by mixing 4 g of the dispersion of zirconium oxide H containing zirconium oxide in a content of 30% by weight, 2.5 g of dipentaerythritol hexaacrylate (DPHA manufactured by Daicel-Cytec Company Ltd.), 0.175 g of 1-hydroxycyclohexyl phenyl ketone ("Irgacure® 184" manufactured by Ciba Specialty Chemicals Inc.), and 0.12 g of methyl isobutyl ketone.

The coating composition was coated on a glass substrate using a bar coater #5, and the coating composition was irradiated with ultraviolet rays at 300 mJ/cm² to cure the coating composition to form film having a thickness of 5 μm on the glass substrate. The film was found to have a total light transmittance of 90.52%, a haze value of 0.27, and a scratch hardness of 9H.

Comparative Example 2

(Preparation of Resin Composition Containing No Zirconium Oxide and Evaluation of Properties Thereof)

A coating composition was prepared by mixing 2.5 g of dipentaerythritol hexaacrylate (DPHA manufactured by Daicel-Cytec Company Ltd.), 0.175 g of 1-hydroxycyclohexyl phenyl ketone ("Irgacure® 184" manufactured by Ciba Specialty Chemicals Inc.), and 2.5 g of methyl isobutyl ketone.

The coating composition was coated on a glass substrate using a bar coater #5, and the coating composition was irradiated with ultraviolet rays at 300 mJ/cm² to cure the coating composition to form film having a thickness of 5 μm on the glass substrate. The film was found to have a total light transmittance of 91.17%, a haze value of 0.06, and a scratch hardness of 5H.

The invention claimed is:

1. A dispersion of zirconium oxide comprising particles of zirconium oxide in a content of 20% by weight or more based on 100% by weight of the dispersion and having a transmittance of 35% or more at a wave length of 400 nm, a transmittance of 95% or more at a wave length of 800 nm, and a viscosity of 20 mPa·s or less at a temperature of 25° C., wherein the transmittance is measured by using a cell having a light path length of 10 mm.

2. The dispersion of zirconium oxide according to claim 1, wherein the zirconium oxide is in a solid solution comprising at least one stabilizing element selected from aluminum, magnesium, titanium and rare earth elements.

3. The dispersion of zirconium oxide according to claim 1 or 2, wherein a dispersion medium of the dispersion of zirconium oxide is water.

4. The dispersion of zirconium oxide according to claim 1 or 2, wherein a dispersion medium of the dispersion of zirconium oxide is an aliphatic alcohol, an aliphatic carboxylic acid ester, an aliphatic ketone, a polyhydric alcohol, or a mixture of two or more of these.

5. A resin composition comprising a resin and the dispersion of zirconium oxide according to claim 1 or 2 incorporated therein.

6. A resin composition comprising a resin and the dispersion of zirconium oxide according to claim 3 incorporated therein.

7. A resin composition comprising a resin and the dispersion of zirconium oxide according to claim 4 incorporated therein.

* * * * *